Patented Dec. 9, 1930

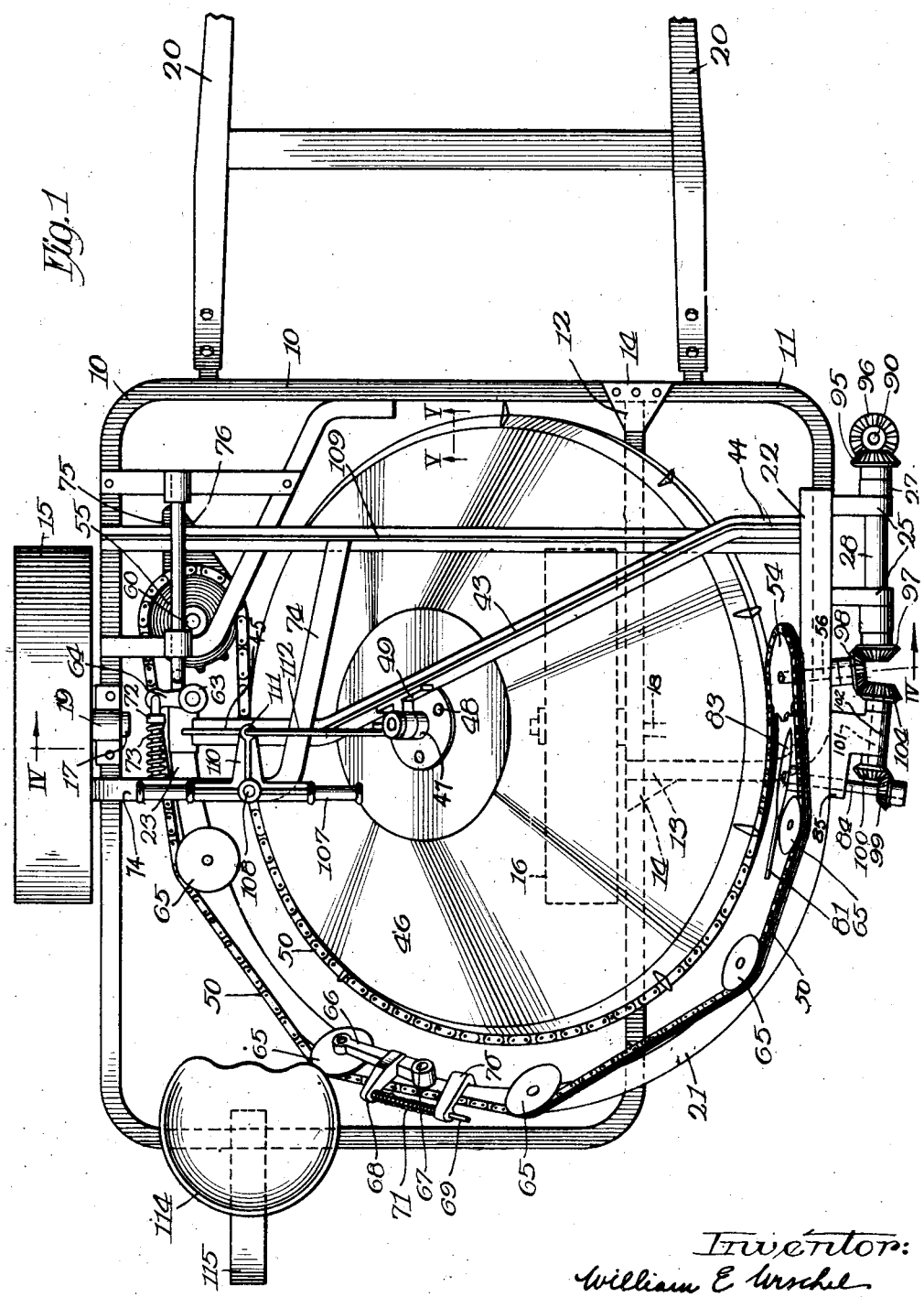

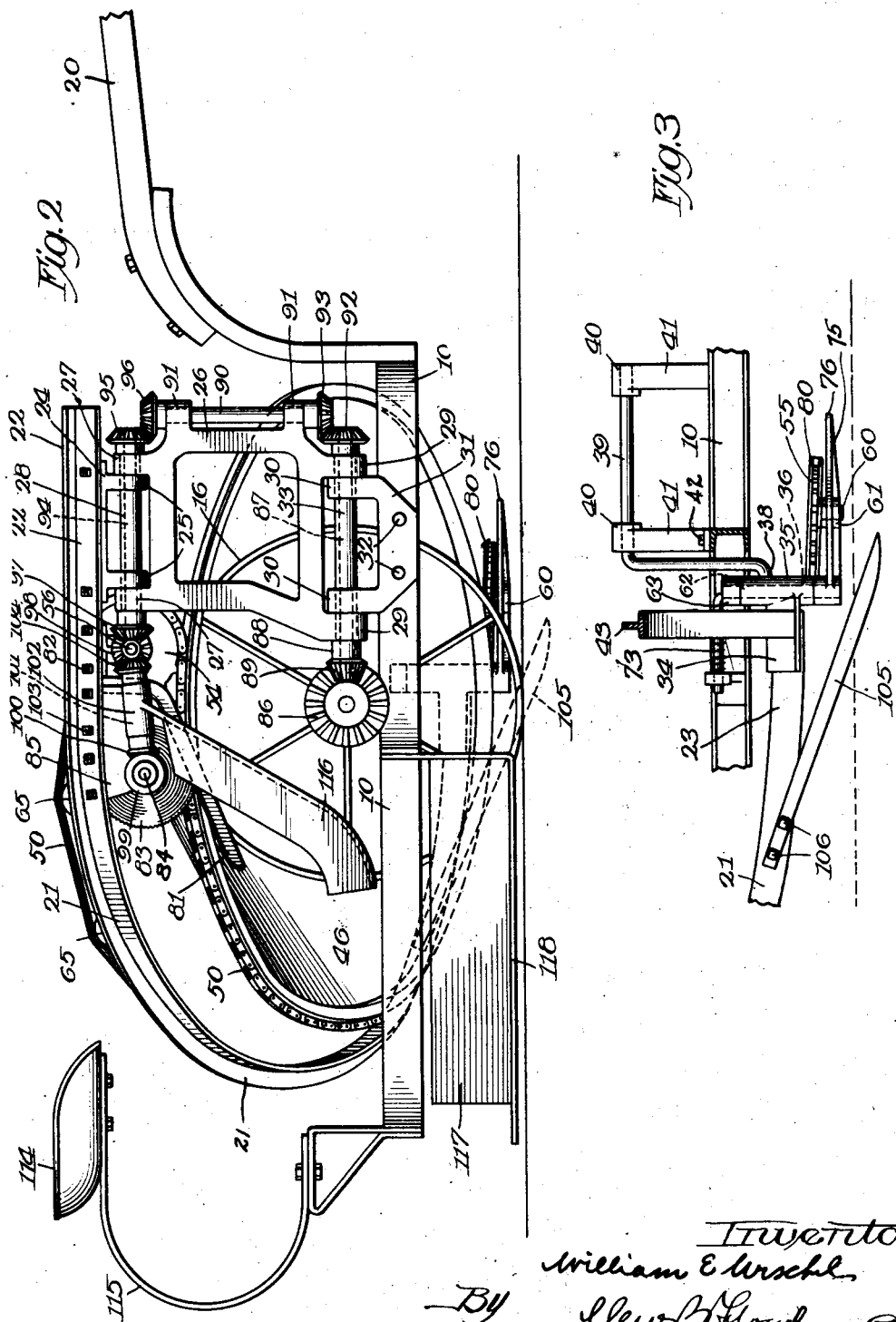

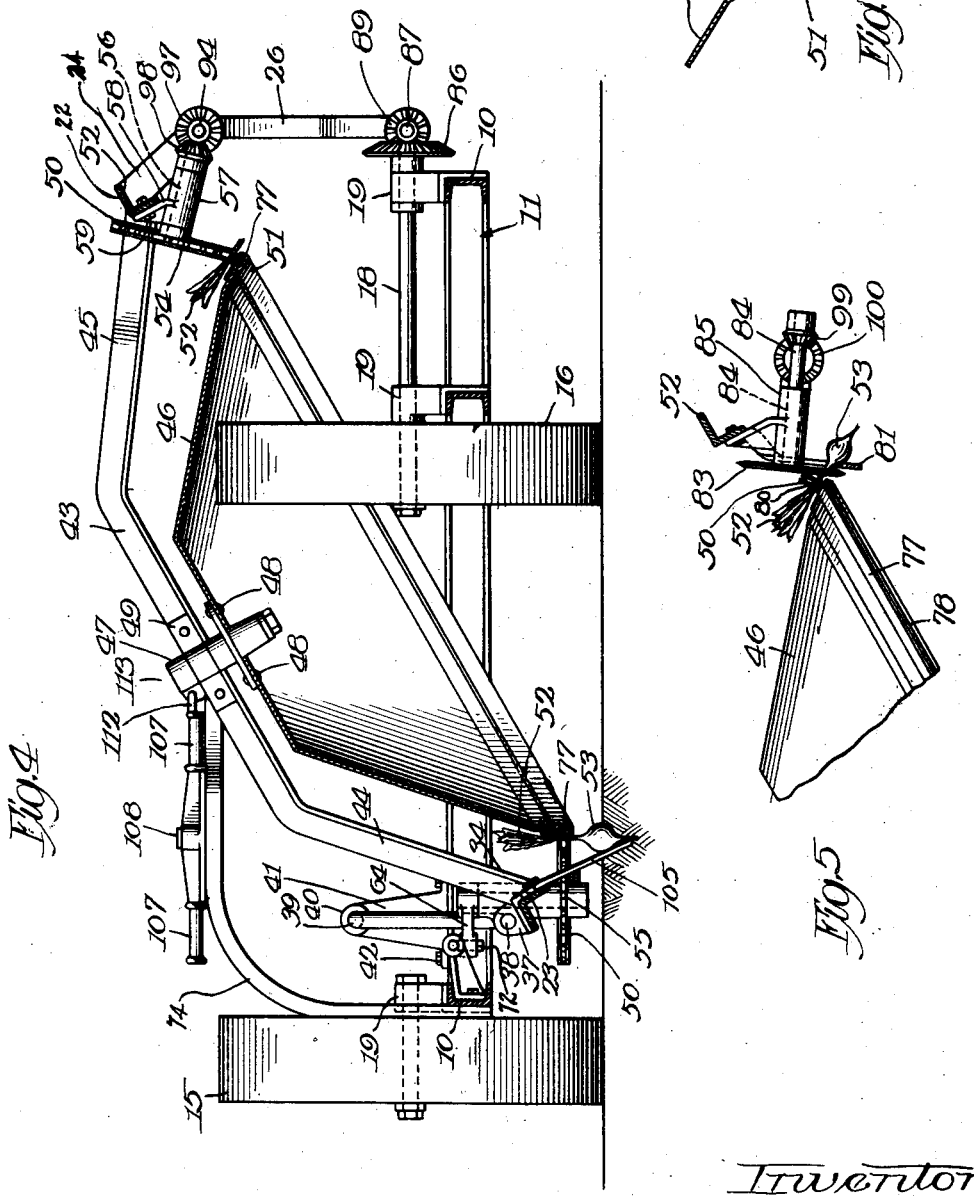

1,784,081

UNITED STATES PATENT OFFICE

WILLIAM E. URSCHEL, OF VALPARAISO, INDIANA

HARVESTING MACHINE

Application filed December 18, 1926. Serial No. 155,720.

This invention relates to harvesting machines, and more particularly to beet harvesters, although it may be employed with equal advantage for other purposes.

It contemplates more especially the provision of a harvesting machine having means thereon to gradually elevate soil embedded crops to effect the removal thereof and to sever the appendages therefrom.

Harvesters of known construction have not proven entirely satisfactory in that the crops generally are tenaciously held in the soil, so that an abrupt pull thereon usually results in a severance of the exposed appendages without removal of the embedded portions.

Further, it is desirable to provide adjustment for the harvesting instrumentalities to enable a variance in the position thereof to effectively harvest crops without injury thereto as well as to grasp them at the proper point, this being highly desirable, especially because their growth and ease of removal are variable factors.

One object of the present invention is to simplify the construction and improve the operation of devices of the character mentioned.

Another object is to provide a means for imparting a gradual pull on soil embedded crops to effect their removal.

Still another object is to provide means for loosening the soil prior to removal of the crops therefrom.

A further object is to provide means for conveying the severed crops along a predetermined path having instrumentalities disposed therein to sever the appendages therefrom.

A still further object is to provide means for guiding the pulling instrumentalities to selectively increase the operating range thereof.

Other objects and advantages will appear from the following description of an illustrated embodiment of the present invention.

In the drawings:

Figure 1 is a plan view of the machine embodying features of the present invention;

Figure 2 is a view in elevation of the machine shown in Figure 1;

Figure 3 is a fragmentary enlarged detail view of the structure shown in Figure 2;

Figure 4 is a sectional view, taken substantially along the line IV—IV of Figure 1;

Figure 5 is an enlarged detail view of instrumentalities shown in Figure 4, wherein the co-action between the article and severing means is disclosed; and Figure 6 is a fragmentary sectional view taken substantially along line V—V of Figure 1.

The structure selected for illustration comprises a channel bar 10 bent or otherwise shaped intermediate the ends thereof at spaced intervals to define a substantially rectangular frame having an auxiliary portion 11 disposed adjacent thereto, the extremities 12 and 13 of the bar 10 being secured to intermediate portions thereof by means of plates 14 riveted or otherwise secured thereto. The frame 10 is elevated from the soil over which it traverses by means of the traction wheels 15 and 16 of standard construction which are keyed or otherwise secured to independent shafts 17 and 18 journalled in suitable bearings 19 detachably fixed to the frame 10 in any appropriate manner, the shafts 17 and 18 being in axial alignment. A member 20 of appropriate construction is secured to the frame 10 to enable suitable means of locomotion to be harnessed thereto whereby the wheeled frame 10 may be selectively moved in a rectilinear or curvilinear path.

To effectively support the harvesting instrumentalities on the frame 10, a U-shaped angular bar 21 is, in this instance adjustably supported in an inclined position with the extremities 22 and 23 disposed in proximity to the forward part of the frame 10. Fixed to the extremity 22 is a bracket 24 having spaced confronting lugs 25 depending therefrom to cooperate with a bracket 26 pivotally associated therewith by virtue of the lugs 27 formed integrally thereon. The lugs 25 and 27 confront each other to receive therethrough a tubular sleeve 28 disposed in aligned apertures provided in the cooperating lugs 25 and 27. Another pair of oppositely projecting lugs 29 are integrally or otherwise secured to the bracket 26 to cooperate with a pair of similarly shaped lugs 30 constituting a part of a bracket 31 riveted or otherwise secured to the frame 10 by means of the fasteners 32. The cooperating lugs 29 and 30 are provided with aligned bores to receive therethrough a tubular sleeve 33 whereby relative movement between the brackets 26 and 31 is permitted.

The other extremity 23 of the bar 21 is fixed to a bracket 34 which has disposed thereon a bearing 35 having a vertically disposed axial bore 36 provided therein. An appropriate flange 37 (Figure 4) is formed integrally with the bracket 34 to receive therethrough a horizontally disposed rod 38, the latter terminating in a parallel portion 39 offset therefrom to project through spaced bearings 40 provided in the standards 41 which are detachably fixed to the frame 10 by means of the fasteners 42 projecting through the base flanges thereof.

With the arrangement of parts thus far described it will be apparent that the U-shaped bar 21 is pivotally associated with the frame 10 at the extremities 22 and 23 thereof to enable the inclination of the bar to be selectively varied for reasons which will be hereinafter apparent.

A bar 43 of suitable shape having diverging end portions 44 and 45 disposed in offset planes, is secured to the extremities 22 and 23 of the U-shaped bar 21 in any suitable manner to support thereon soil embedded article pulling means, in this instance a dished drum 46. A flanged bearing 47 is fixed to the drum 46 axially thereof by means of the fasteners 48, the bearing 47 being journalled in a suitable bearing housing 49 secured, in this instance, along the median line of the bar 43 to rotatively support the drum 46 in an inclined position.

The pulling means constitute, in this instance, the drum 46 and an endless chain 50 adapted to contact with the periphery 51 of the drum 46 to engage the exposed appendages 52 of soil embedded crops such as beets 53. The chain 50 is suspended between a pair of sprocket wheels 54 and 55 meshing therewith, the sprocket 54 having a stud shaft 56 axially fixed thereto for rotative movement in a bearing 57 (Figure 4) supported from the bar 21 by means of a bracket 58 formed integral therewith.

As shown in Figure 4, the bracket 58 is detachably fixed to the extremity 22 of the bar 21 by means of the fasteners 59 of standard construction. The sprocket 55 is provided with an axially disposed shaft 60 journalled in a vertically disposed bearing 61 which is pivotally associated with the bearing 35, supra, by means of a shaft 62 having an extremity thereof provided with a hub 63 which has an arm 64 formed integrally thereon, the hub 63 being fixed to the projecting extremity of the stud shaft 62 in any suitable manner to prevent removal thereof from the bearing 35. A plurality of idlers 65 are rotatively mounted at predetermined spaced intervals along the bar 21 to mesh with the chain 50 carried thereby to effect contact with a portion of the periphery 51 of the drum 46 between selective limits controlled by the position of the sprockets 54 and 55. The chain 50 is automatically tensioned by imparting movement to one of the idlers 65 having an arm 66 pivotally associated therewith, the latter being pivoted to the bar 21 by means of a pin 67. A lug 68 is formed integral with the arm 66 to receive therethrough a rod 69 slidably associated with a lug 70 fixed to the member 21 in confronting relation with the lug 68. A spiral spring 71 envelopes a rod 69 intermediate the confronting lugs 68 and 70 to impart an urge to the arm 66 which carries an idler 65 normally extended to tension the chain 50 in mesh therewith.

The sprocket 55, supra, is pivotally mounted about the shaft 62 having an arm 64 fixed thereto, the latter being provided with a rod 72 (Figure 1) pivotally associated therewith to receive thereon a spring 73 which coacts with an auxiliary support 74 provided on the frame 10 to urge the sprocket wheel 55 in the direction of the drum 46 to tension the endless chain 50 about the periphery 51 of the drum 46. As shown, the bearing 61 has a horizontally disposed guard 75 formed integrally therewith, the latter being provided with an inclined surface 76 to increase the operating range of the pulling instrumentalities, supra. The resilient means 73 will permit pivotal movement of the sprocket wheel 55 to permit foreign substances, such as rocks and the like, to be received between the chain 50 and the periphery 51 without causing injury thereto, in that the guard 75 will tend to move away from the drum to release the foreign substance lodged therebetween.

The contacting surfaces of the drum 46 and the chain 50 are, in this instance, provided with yieldable means to enable the exposed appendages of soil embedded crops to be more effectively gripped. The yieldable means consists, in this instance, of a flexible band 77 having a substantially rectangular cross section, carried in a U-shaped depression 78 defining a raceway about the periphery 51 of the drum 46. The periphery 51 constitutes a channel bar of suitable construction having a flange 79 suitably fixed thereto to enable the channel bar 78 to be conveniently secured to the drum 46 in any suitable manner as technical practice may dictate. A flexible band 80 similar in construction to the band 77 is secured in any suitable manner to the contacting surface of the chain 50 so as to establish contact between the power driven endless chain 50 and the drum 46 contacting therewith and driven in unison thereby.

Topping means are preferably disposed in the path of the articles carried by the pulling instrumentalities to sever the appendages from the crops. The topping or severing means, in this instance, comprises a stationary blade 81 fixed to the bar 21 by the fasteners 82, the blade 81 being disposed in an inclined position to receive thereon the crops which are guided to a revolving toothed disk 83 provided with an axially disposed stud shaft 84 journalled in a bearing 85 depending from the bar 21 in proximity to the blade 81. The disk 83 cooperates with the blade 81 to sever the appendages 52 from the crop 53 as the latter is guided therebetween in the manner illustrated in Figure 5.

The instrumentalities described above are preferably rendered active responsive to the movement of the wheeled frame 10, since the stud shaft 18 is provided with a beveled gear 86 fixed to the projecting extremity thereof. A horizontally disposed shaft 87 is journalled in the tubular sleeve 33, supra, with the extremities of the shaft projecting beyond the lugs 29 to receive the collars 88 detachably affixed to the shaft 87 to prevent axial movement thereof. A bevel pinion 89 secured to one extremity of the shaft 87 meshes with the gear 86 to operatively connect a vertically disposed shaft 90 journalled in spaced bearings 91 formed integral with the bracket 26, the shaft 87 having a bevel gear 92 fixed to the other extremity thereof to mesh with a correspondingly shaped gear 93 secured to the vertically disposed shaft 91. Movement of the shaft 90 imparts rotation to a horizontally disposed shaft 94 journalled in the sleeve 28, the shaft 94 having a bevel gear 95 fixed to the extremity thereof to mesh with a gear 96 secured to the shaft 90. The shaft 94 is operatively connected to the stud shaft 56 of the sprocket wheel 54, through the medium of cooperating bevel gears 97 and 98 fixed to the shafts 94 and 56, respectively. The projecting extremity of the stud shaft 84 secured to the rotary cutter 83, is provided with a bevel gear 99 adapted to mesh with a bevel gear 100 carried by a stud shaft 101 journalled in a suitable bearing 102 fixed to the bar 21 in any appropriate manner, such as by the fasteners 103. The shaft 101 has a bevel gear 104 fixed to the other projecting extremity thereof to mesh with a bevel gear 98 which is operatively connected to the driving means hereinabove described.

The fact that the crops are usually tenaciously embedded in the soil, renders it desirable to provide soil loosening means, such as a plow 105 of suitable construction secured to the bar 21 by means of the fasteners 106 to effect the loosening of the soil about the crop just prior to the removal thereof so that the pull imparted to the exposed appendage will not be severed from the article which otherwise would be retained in the soil. It is to be noted that the plow 105 may be adjustably supported on the bar 21 so that it may be effectively employed for the purpose set forth.

It will be apparent from the inclination of the drum 46, that the articles will be gradually elevated along a predetermined circular path to effect the removal thereof without imparting an abrupt pull to the appendage 52 which would result in the severance thereof from the article 53 without removal of the latter. Under conditions where the soil embedded crops are not in linear alignment, it is desirable to shift the pulling members in line therewith, thereby increasing the operating range of the machine and avoiding the necessity of carefully directing the member along an absolute linear path. To accomplish this end, the drum 46 is adjustably supported from the bar 43 secured to the U-shaped member 21 which is pivotally associated with the frame 10 at the extremities thereof.

Pedal control means 107 are pivotally associated with the bar 74 by means of the pin 108, the bar 74 being secured to a cross member 109 fixed to the frame 10. An arm 110, in this instance formed integrally with the pedal means 107, is provided with an aperture 111 at the free extremity thereof to receive a rod 112 therethrough. The other extremity of the rod 112 is operatively connected to the bearing 47 journalled in the supporting bar 43 whereby the lateral position thereof may be varied by the remote means 107 actuated in any suitable manner by the attendant who is supported on a seat 114 yieldably associated with the frame 10 through the medium of a more or less flexible member 115.

With the above arrangement of parts, it will be apparent that movement of the wheel frame 10 will impart rotation to the sprocket wheel 55 which is in mesh with the chain 50 contacting with the periphery 51 of the drum 46 to effectively engage the exposed appendages 52 of the soil embedded articles 53 carried between the yieldable gripping faces 77 and 80 of the pulling instrumentalities. The articles 53 are carried through a predetermined inclined path and gradually removed from the soil whereupon they are directed along the stationary blade 81, the appendages being severed therefrom by means of the disk 83 coacting with the blade 81, the articles 53 falling through an appropriate chute 116, in this instance, suspended from the bearing 102 to direct the articles to a suitable container 117 carried by the frame 10 by means of an appropriate bracket 118.

Various changes may be made in the embodiment of the invention herein specifically described without departing from or sacrificing any of the advantages thereof as defined in the appending claims.

I claim:

1. The combination with a wheeled frame, of a U-shaped support adjustably associated with said frame, a circular member rotatively associated with said support, and an endless belt carried by said U-shaped support to contact with said circular member which moves in unison therewith, said circular member and belt constituting soil embedded article pulling means.

2. The combination with a wheeled frame, of a support adjustably associated with said frame, a circular member rotatively associated with said support, an endless belt carried by said support to contact with said circular member which moves in unison therewith, said circular member and belt constituting soil embedded article pulling means, and means for pivotally connecting the ends of said support to said frame to enable adjustment of said circular member.

3. The combination with a wheeled frame, of a support, brackets pivotally associated with said support and frame to enable relative movement therebetween, a circular member revoluble on said support, endless flexible means associated with said support to engage the periphery of said circular member, and yieldable engaging surfaces on said circular and endless members to constitute article engaging means.

4. The combination with a wheeled frame, of a support, brackets pivotally associated with said support and frame to enable relative movement therebetween, a circular member revoluble on said support, endless flexible means associated with said support to engage the periphery of said circular member, yieldable engaging surfaces on said circular and endless members to constitute article engaging means, and topping means driven by said endless member responsive to the movement of said frame.

5. The combination with a wheeled frame, of a truncated cone having at its edge a second and narrow truncated section of more nearly cylindrical configuration than the major portion of said cone, and flexible means coacting with the periphery of said second section to elevate soil embedded articles along a circular path to effect the removal thereof from the soil.

6. The combination with a wheeled frame, of soil embedded article pulling means comprising a truncated cone having an oblique axis whereby the face of said cone adjacent its lowermost edge closely approached the vertical, and a flexible member engaging the periphery of said cone at its greatest diameter.

7. The combination with a wheeled frame, of soil embedded article pulling means comprising a truncated cone disposed in an inclined plane whereby the face of said cone adjacent the ground approaches the vertical, and flexible means engaging the periphery of said cone.

8. The combination with a wheeled frame, of a truncated cone member having an oblique axis of revolution whereby the face of said member adjacent the ground travels in a substantially vertical plane, means coacting with said truncated cone member to engage soil embedded articles, and article severing means in the path of articles held between said cone member and coating means.

9. The combination with a wheeled frame, of a rotatable inclined truncated cone mounted thereon, the inclination of said cone being such that at the portion thereof adjacent the ground the face of said cone travels in a substantially vertical path, and driving means frictionally geared to major periphery of said cone to carry articles between said driving means and cone.

10. The combination with a wheeled frame, of a rotatable truncated cone mounted thereon, the axis of revolution of said cone being inclined sufficiently to bring the lower edge of said cone close to the ground with its adjacent face travelling in a substantially vertical path, driving means frictionally geared to said cone at its major periphery to carry articles therebetween, said driving means being responsive to movement of said frame, and topping means on said frame in mesh with said driving means.

11. The combination with a wheeled frame, of a truncated cone member mounted thereon in an inclined position, a grasping band upon the edge of said cone member and having a face angularly disposed in respect to the face of said cone, and means coacting therewith to gradually elevate soil embedded articles to effect the removal thereof from the soil, said articles being drawn from the soil by a substantially vertical lift incidental to the coaction of said grasping band and elevating means.

12. The combination with a wheeled frame, of a truncated cone member mounted thereon and disposed in an inclined plane, a grasping band about the edge of said cone and having a face at an angle to the face of said cone, a flexible member tensioned about said grasping band, means for varying the tension of said flexible member, and driving means geared to said flexible member to drive said grasping band and said truncated cone member in unison therewith.

WILLIAM E. URSCHEL.